(12) United States Patent
Kobayashi

(10) Patent No.: US 7,180,728 B2
(45) Date of Patent: Feb. 20, 2007

(54) SOLID ELECTROLYTIC CAPACITOR AND METHOD OF MANUFACTURING THE SAME

(75) Inventor: Nobuyuki Kobayashi, Higashiosaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 11/248,201

(22) Filed: Oct. 13, 2005

(65) Prior Publication Data

US 2006/0084237 A1    Apr. 20, 2006

(30) Foreign Application Priority Data

Oct. 15, 2004  (JP)  ............... 2004-301282

(51) Int. Cl.
*H01G 5/013* (2006.01)
*H01G 4/06* (2006.01)
*H01G 9/02* (2006.01)

(52) U.S. Cl. ............... 361/524; 361/525; 361/528

(58) Field of Classification Search ........ 361/523–525, 361/528, 532
See application file for complete search history.

(56) References Cited

U.S. PATENT DOCUMENTS 3,614,544 A * 10/1971 Mosebach et al. .......... 361/524
5,729,428 A * 3/1998 Sakata et al. ............... 361/523
6,215,651 B1 * 4/2001 Takada et al. .............. 361/523

FOREIGN PATENT DOCUMENTS

| JP | 2-74021 | 3/1990 |
|---|---|---|
| JP | 4-73924 | 3/1992 |
| JP | 8-293436 | 11/1996 |
| JP | 11-219860 | 8/1999 |

* cited by examiner

*Primary Examiner*—Eric W. Thomas
(74) *Attorney, Agent, or Firm*—Armstrong, Kratz, Quintos, Hanson & Brooks, LLP

(57) ABSTRACT

A solid electrolytic capacitor using a conductive polymer compound as a solid electrolyte includes an anode body, a dielectric oxide coating formed on a surface of the anode body, a first conductive polymer compound layer formed on a portion of the dielectric oxide coating, a silane coupling agent treatment layer formed at least on a portion of the dielectric oxide coating on which the first conductive polymer compound layer is not formed, and a second conductive polymer compound layer formed on the first conductive polymer compound layer and the silane coupling agent treatment layer. With this, a solid electrolytic capacitor having a high capacitance, a low ESR and high reliability and a method of manufacturing the solid electrolytic capacitor can be provided.

4 Claims, 2 Drawing Sheets

SOLID ELECTROLYTIC CAPACITOR AND METHOD OF MANUFACTURING THE SAME

BACKGROUND OF THE INVENTION

1. Field of the Invention

The present invention relates to a solid electrolytic capacitor using a conductive polymer compound as a solid electrolyte and a method of manufacturing the solid electrolytic capacitor.

2. Description of the Background Art

In connection with size and weight reductions of electric equipment in recent years, a small capacitor of a large capacity for high frequencies has come to be required. As such a capacitor, a solid electrolytic capacitor using a conductive polymer compound to form a solid electrolyte layer has been proposed.

The solid electrolytic capacitor has a problem of a decrease in adhesion between a dielectric oxide coating, which is formed by oxidation of a surface of an anode body formed with a sintered body of a valve metal such as tantalum, niobium, titanium, or aluminum, and a solid electrolyte layer formed on the dielectric oxide coating, which results in an increased LC (Leaked Current), an increased ESR (Equivalent Series Resistance) and decreased reliability.

To solve the problem, a method for increasing the adhesion between the dielectric oxide coating and the conductive polymer compound layer has been proposed, which includes steps of forming the dielectric oxide coating on the surface of the anode body, treating a surface thereof with a silane coupling agent, and then forming on the surface the conductive polymer compound layer as a solid electrolyte layer to let the silane coupling agent be interposed between the dielectric oxide coating and the conductive polymer compound layer (for example, see Japanese Patent Laying-Open Nos. 02-074021, 04-073924 and 08-293436).

In addition, a method for increasing the adhesion between the dielectric oxide coating formed on a surface of a porous anode body and the conductive polymer compound layer has been proposed, which includes steps of repeating treatment of the dielectric oxide coating with a silane coupling agent and formation of the conductive polymer compound layer to form a first surface treatment layer with the silane coupling agent on the dielectric oxide coating inside the porous body, forming a first conductive polymer compound layer on the first surface treatment layer, forming a second surface treatment layer with the silane coupling agent on the dielectric oxide coating on an outer periphery of the porous body, and forming a second conductive polymer compound layer on the second surface treatment layer (for example, see Japanese Patent Laying-Open No. 11-219860).

Though the adhesion between the dielectric oxide coating and the conductive polymer compound layer is increased while a low ESR is maintained and reliability is increased with each of the methods described above, a capacitance is decreased because of existence of the surface treatment layer with the silane coupling agent (hereafter referred to as a "silane coupling agent treatment layer") formed between the dielectric oxide coating and the conductive polymer compound layer.

SUMMARY OF THE INVENTION

An object of the present invention is to provide a solid electrolytic capacitor having a high capacitance, a low ESR and high reliability and a method of manufacturing the solid electrolytic capacitor.

According to an aspect of the present invention, a solid electrolytic capacitor using a conductive polymer compound as a solid electrolyte includes an anode body, a dielectric oxide coating formed on a surface of the anode body, a first conductive polymer compound layer formed on a portion of the dielectric oxide coating, a silane coupling agent treatment layer formed at least on a portion of the dielectric oxide coating on which the first conductive polymer compound layer is not formed, and a second conductive polymer compound layer formed on the first conductive polymer compound layer and the silane coupling agent treatment layer.

In the solid electrolytic capacitor according to the present invention, a spacing between one portion layer forming the first conductive polymer compound layer and another portion layer adjacent thereto can be at least 10 nm and smaller than 100 μm. In addition, the first and second conductive polymer compound layers can include polypyrrole or polythiophene.

According to another aspect of the present invention, a method of manufacturing a solid electrolytic capacitor using a conductive polymer compound as a solid electrolyte includes the steps of forming a dielectric oxide coating on a surface of an anode body, forming a first conductive polymer compound layer on a portion of the dielectric oxide coating, forming a silane coupling agent treatment layer at least on a portion of the dielectric oxide coating on which the first conductive polymer compound layer is not formed, and forming a second conductive polymer compound layer on the first conductive polymer compound layer and the silane coupling agent treatment layer.

In the method of manufacturing a solid electrolytic capacitor according to the present invention, a spacing between one portion layer forming the first conductive polymer compound layer and another portion layer adjacent thereto can be at least 10 nm and smaller than 100 μm. In addition, the first conductive polymer compound layer can be formed by chemical oxidative polymerization or electrolytic oxidative polymerization. Furthermore, the second conductive polymer compound layer can be formed by chemical oxidative polymerization or electrolytic oxidative polymerization.

According to the present invention, a solid electrolytic capacitor having a high capacitance, a low ESR and high reliability and a method of manufacturing the solid electrolytic capacitor can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
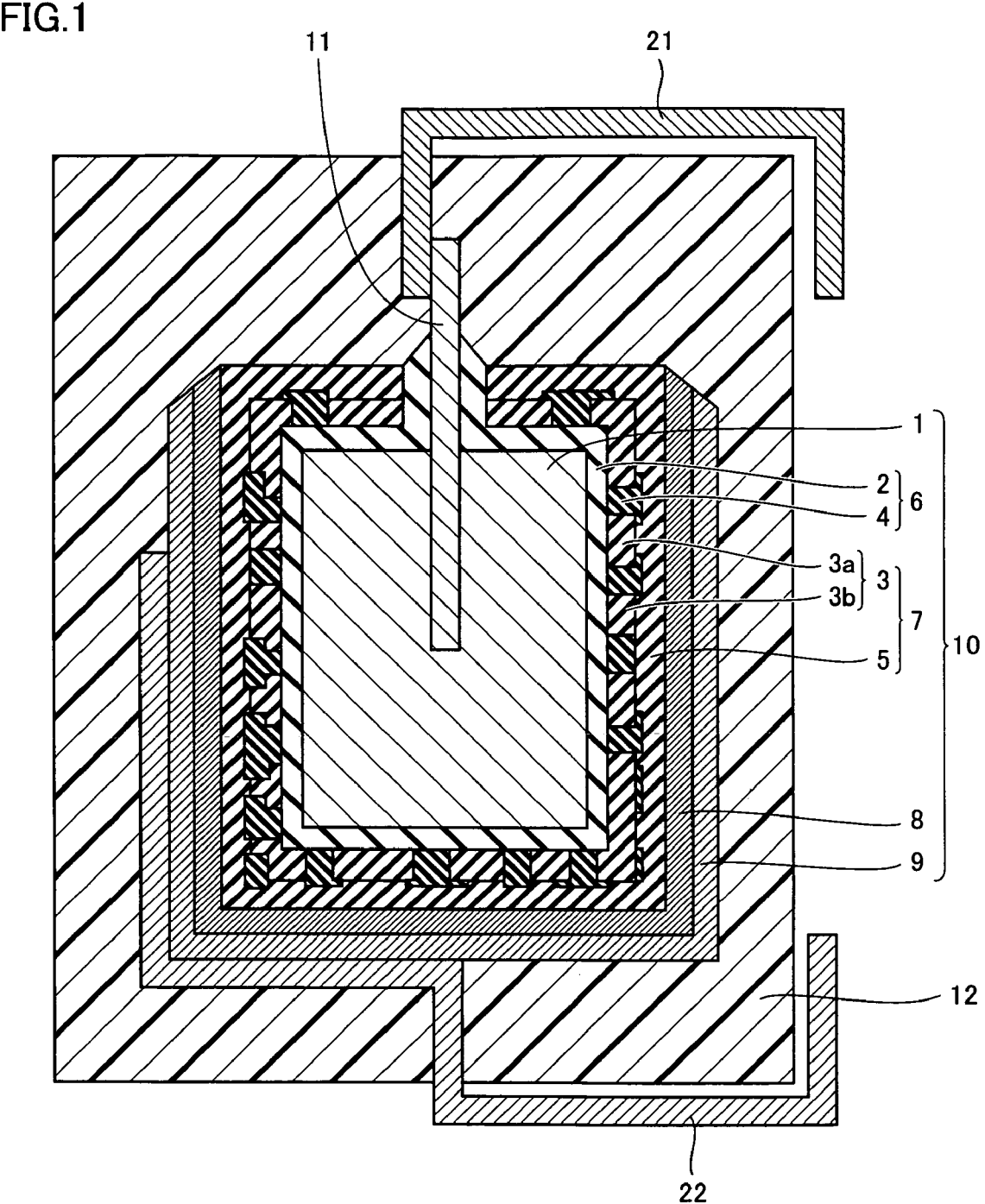
FIG. 1 is a schematic cross-sectional view of a solid electrolytic capacitor according to the present invention.

Referring to FIG. 1, a solid electrolytic capacitor according to the present invention includes an anode body 1, a dielectric oxide coating 2 formed on a surface of anode body 1, a first conductive polymer compound layer 3 formed on a portion of dielectric oxide coating 2, a silane coupling agent treatment layer 4 formed at least on a portion of dielectric oxide coating 2 on which first conductive polymer compound layer 3 is not formed, and a second conductive polymer compound layer 5 formed on first conductive polymer compound layer 3 and silane coupling agent treatment layer 4.

Since silane coupling agent treatment layer 4 functions as a dielectric, a capacitance of the solid electrolytic capacitor is increased by forming first conductive polymer compound layer 3 and silane coupling agent treatment layer 4 respectively on portions of dielectric oxide coating 2 and forming second conductive polymer compound layer 5 on first conductive polymer compound layer 3 and silane coupling agent treatment layer 4 to increase a contact area between a dielectric layer 6, which is formed with dielectric oxide coating 2 and silane coupling agent treatment layer 4, and a solid electrolyte layer 7 formed with first conductive polymer compound layer 3 and second conductive polymer compound layer 5. In addition, a low ESR can be maintained because first conductive polymer compound layer 3 and second conductive polymer compound layer 5 (that is, solid electrolyte layer 7) are tightly adhered to dielectric oxide coating 2 with silane coupling agent treatment layer 4 formed on a portion thereof.

Figure 2:
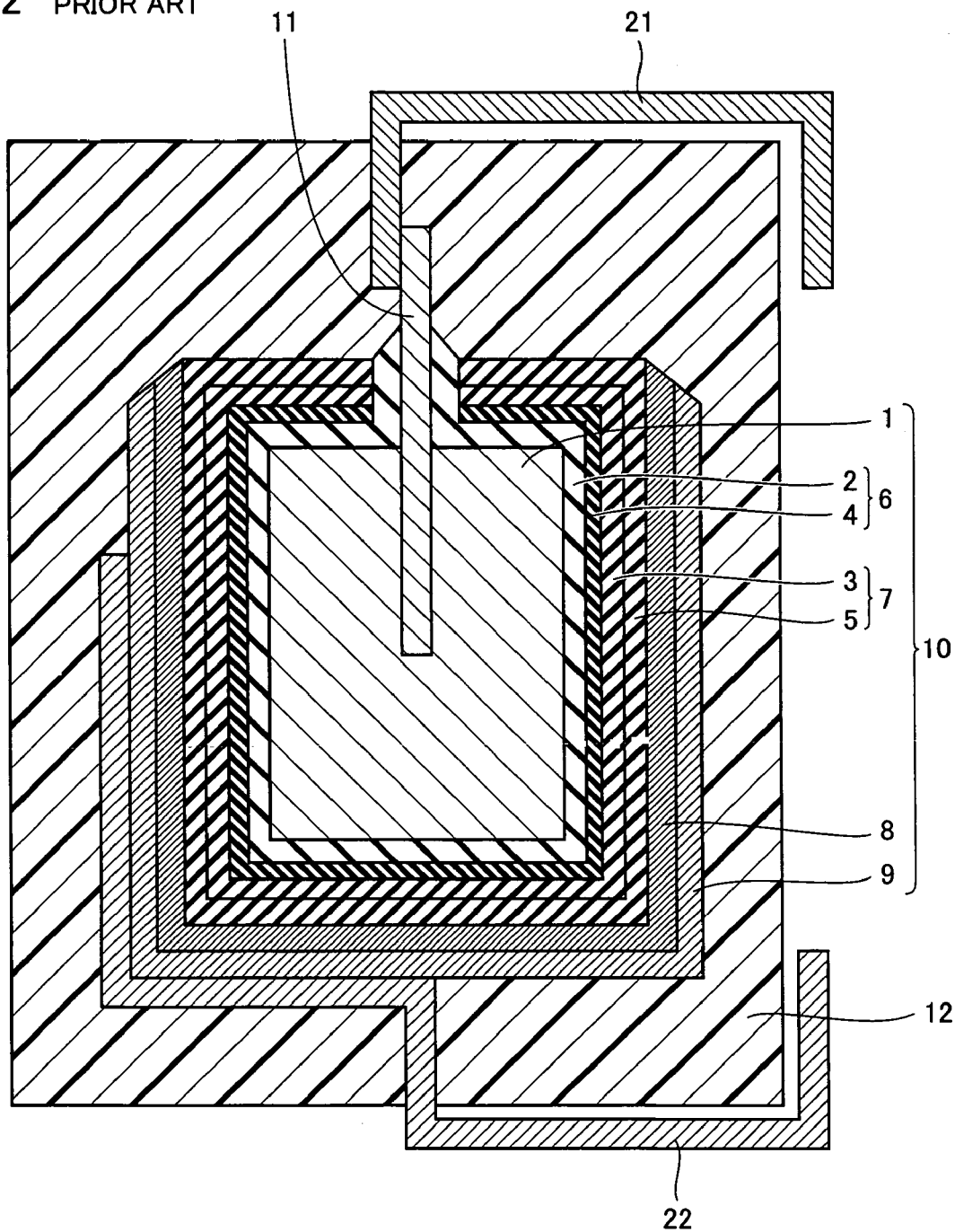
FIG. 2 is a schematic cross-sectional view of a conventional solid electrolytic capacitor.

In contrast, referring to FIG. 2, a conventional solid electrolytic capacitor includes anode body 1, dielectric oxide coating 2 formed on a surface of anode body 1, silane coupling agent treatment layer 4 formed on dielectric oxide coating 2, first conductive polymer compound layer 3 formed on silane coupling agent treatment layer 4, and second conductive polymer compound layer 5 formed on first conductive polymer compound layer 3. The conventional solid electrolytic capacitor has increased adhesion between dielectric oxide coating 2 and first conductive polymer compound layer 3 (that is, increased adhesion between dielectric oxide coating 2 and solid electrolyte layer 7) because of existence of silane coupling agent treatment layer 4. When silane coupling agent treatment layer 4 is formed on dielectric oxide coating 2, however, dielectric layer 6 becomes thicker because silane coupling agent treatment layer 4 functions as a dielectric, and therefore an ESR is increased and a capacitance is decreased.

Referring to FIG. 1, since first conductive polymer compound layer 3 and silane coupling agent treatment layer 4 are respectively formed on portions of dielectric oxide coating 2 in the present invention, the contact area between dielectric layer 6 (dielectric oxide coating 2 and silane coupling agent treatment layer 4) and solid electrolyte layer 7 (first conductive polymer compound layer 3 and second conductive polymer compound layer 5) is increased, and thereby a capacitance can be increased while a low ESR is maintained and reliability as a capacitor is increased.

In the solid electrolytic capacitor, a spacing between one portion layer 3a forming first conductive polymer compound layer 3 and another portion layer 3b adjacent to portion layer 3a is preferably at least 10 nm and smaller than 100 μm. When the spacing between portion layers 3a, 3b is less than 10 nm, a silane coupling agent cannot easily enter a space between portion layers 3a, 3b and therefore formation of silane coupling agent treatment layer 4 is inhibited. When the spacing between portion layers 3a, 3b is 100 μm or larger, an increase in the contact area between dielectric layer 6 formed with dielectric oxide coating 2 and silane coupling agent treatment layer 4 and first and second conductive polymer compound layers 3 and 5 becomes smaller, an increase in the capacitance becomes smaller and the ESR is not sufficiently decreased. The spacing between portion layers 3a, 3b can be measured with an SEM (scanning electron microscope) or a porosimeter (a pore distribution measurement device). The one portion layer forming the first conductive polymer compound layer and the adjacent portion layer may be separated from each other or may be partially linked to each other. In addition, the spacing between the one portion layer and the adjacent portion layer means a minimum distance between an end portion of the one portion layer and an end portion of the adjacent portion layer.

Though a conductive polymer compound forming each of the first and second conductive polymer compound layers of the solid electrolytic capacitor is not specifically limited, polypyrrole or polythiophene is preferably included in terms of high conductivity and easiness of restoration of defectiveness of dielectric oxide coating 2 (removal of a dopant from the conductive polymer compound by aging or the like to make a portion of the solid electrolyte layer formed with the conductive polymer compound insulated).

Details of the solid electrolytic capacitor will now be described. Referring to FIG. 1, on a surface of anode body 1 formed with a sintered body of a valve metal such as tantalum, niobium, titanium, or aluminum, dielectric oxide coating 2 is formed by oxidizing the surface of anode body 1, then first conductive polymer compound layer 3 is formed on a portion of dielectric oxide coating 2, silane coupling agent treatment layer 4 is formed on a portion of dielectric oxide coating 2 on which first conductive polymer compound layer 3 is not formed, and second conductive polymer compound layer 5 is formed on first conductive polymer compound layer 3 and silane coupling agent treatment layer 4. First conductive polymer compound layer 3 and second conductive polymer compound layer 5 form solid electrolyte layer 7. A carbon layer 8 containing conductive carbon is further formed on second conductive polymer compound layer 5, and a cathode extraction layer 9 formed with silver paste or the like is formed on carbon layer 8 to construct a capacitor element 10. Furthermore, an anode terminal 21 is connected to an anode lead member 11 inserted into anode body 1 from one end surface thereof, a cathode terminal 22 is connected to cathode extraction layer 9, and capacitor element 10 is covered and sealed with an exterior resin 12 such as an epoxy resin.

Referring to FIG. 1, a method of manufacturing a solid electrolytic capacitor according to the present invention includes the steps of forming dielectric oxide coating 2 on a surface of anode body 1, forming first conductive polymer compound layer 3 on a portion of dielectric oxide coating 2, forming silane coupling agent treatment layer 4 at least on a portion of dielectric oxide coating 2 on which first conductive polymer compound layer 3 is not formed, and forming second conductive polymer compound layer 5 on first conductive polymer compound layer 3 and silane coupling agent treatment layer 4.

Since first conductive polymer compound layer 3 and silane coupling agent treatment layer 4 are respectively formed on portions of dielectric oxide coating 2 and second conductive polymer compound layer 5 is formed on first conductive polymer compound layer 3 and silane coupling agent treatment layer 4, the contact area between dielectric layer 6 (dielectric oxide coating 2 and silane coupling agent treatment layer 4) and solid electrolyte layer 7 (first conductive polymer compound layer 3 and second conductive polymer compound layer 5) is increased, and thereby the capacitance increases.

The method of manufacturing the solid electrolytic capacitor will now be described in detail. The step of forming dielectric oxide coating 2 on a surface of anode body 1 is performed by oxidizing the surface of anode body 1 formed with a sintered body of a valve metal such as tantalum, niobium, titanium, or aluminum to form an oxide coating which is a dielectric layer. Though a method for forming dielectric oxide coating 2 is not specifically limited, anodic oxidation of anode body 1 in a phosphoric acid solution, for example, is preferably performed.

Though a method for forming first conductive polymer compound layer 3 on a portion of dielectric oxide coating 2 is not specifically limited, chemical oxidative polymerization or electrolytic oxidative polymerization is preferably performed. The chemical oxidative polymerization is a method of oxidative polymerization of monomers using an oxidizing agent, which has an advantage that the conductive polymer compound layer can be formed even in a pore of the anode body. Though the oxidizing agent is not specifically limited, a persulfate such as ammonium persulfate, potassium persulfate or sodium persulfate, a metal halide such as ferric chloride or aluminium chloride, a peroxide such as hydrogen peroxide, or the like is used. The electrolytic oxidative polymerization is a method of oxidative polymerization of monomers on an anode utilizing an oxidation reaction performed on the anode, which has an advantage that a thickness and a physical property of the conductive polymer compound layer can be easily controlled. First conductive polymer compound layer 3 can be formed on a portion of dielectric oxide coating 2 by controlling a polymerization condition such as a concentration of monomers in a polymerization solution, a temperature of the polymerization solution, or a polymerization time in the chemical oxidative polymerization or the electrolytic oxidative polymerization. In the step of forming the conductive polymer compound layer, a dopant is added during polymerization of monomers to develop and enhance conductivity. Though the dopant is not specifically limited as long as it is readily incorporated in the conductive polymer to enhance conductivity thereof, a sulfonic acid such as benzenesulfonic acid, alkyl benzenesulfonic acid, naphthalenesulfonic acid, or alkyl naphthalenesulfonic acid, or a salt thereof is preferably used because it has high conductivity.

In the step of forming first conductive polymer compound layer 3, a spacing between one portion layer 3a forming the first conductive polymer compound layer and another portion layer 3b adjacent to portion layer 3a is preferably made to be at least 10 nm and smaller than 100 μm. When the spacing between portion layers 3a, 3b is less than 10 nm, a silane coupling agent cannot easily enter a space between portion layers 3a, 3b and therefore formation of silane coupling agent treatment layer 4 is inhibited. When the spacing between portion layers 3a, 3b is 100 μm or larger, an increase in the contact area between dielectric layer 6 formed with dielectric oxide coating 2 and silane coupling agent treatment layer 4 and first and second conductive polymer compound layers 3 and 5 becomes smaller, an increase in the capacitance becomes smaller and the ESR is not sufficiently decreased. The spacing between portion layers 3a, 3b can be controlled by controlling a polymerization condition such as a concentration and a temperature of the polymerization solution as well as a polymerization time in the chemical oxidative polymerization or the electrolytic oxidative polymerization. The spacing between portion layers 3a, 3b becomes larger, for example, when the polymerization solution has a lower monomer concentration and a lower temperature and when a polymerization time is shorter.

Though a method for forming silane coupling agent treatment layer 4 at least on a portion of dielectric oxide coating 2 on which first conductive polymer compound layer 3 is not formed is not specifically limited, a method of surface treatment of dielectric oxide coating 2 using a silane coupling agent is preferably used in terms of high workability, such as immersing in a solution containing the silane coupling agent anode body 1 after the step of forming first conductive polymer compound layer 3 on a portion of dielectric oxide coating 2, which is followed by drying, or application of the solution containing the silane coupling agent on dielectric oxide coating 2 of anode body 1 after the step of forming first conductive polymer compound layer 3 on a portion of dielectric oxide coating 2, which is followed by drying. With the method mentioned above, silane coupling agent treatment layer 4 is mainly formed on a portion of dielectric oxide coating 2 on which first conductive polymer compound layer 3 is not formed. Though the silane coupling agent treatment layer is sometimes formed also on first conductive polymer compound layer 3, that does not degrade a property of the solid electrolytic capacitor.

The silane coupling agent used to form silane coupling agent treatment layer 4 is not specifically limited as long as it is dielectric and increases adhesion between dielectric oxide coating 2 and solid electrolyte layer 7, which can be vinyltrichlorosilane, vinyl(β-methoxysilane), vinyltriethoxysilane, γ-methacryloxysilane, β-(3,4-epoxycyclohexyl)ethyltrimethoxysilane, γ-glycidoxypropyltrimethoxysilane, N-β-(aminoethyl)-γ-aminopropylmethyldimethoxysilane, N-β-(aminoethyl)-γ-aminopropyltrimethoxysilane, γ-aminopropyltriethoxysilane, N-phenyl-γ-aminopropyltrimethoxysilane, γ-mercaptopropyltrimethoxysilane, γ-chloropropyltrimethoxysilane, or the like.

Though a method for forming second conductive polymer compound layer 5 on first conductive polymer compound layer 3 and silane coupling agent treatment layer 4 is not specifically limited, chemical oxidative polymerization or electrolytic oxidative polymerization is preferably performed. As described above, the chemical oxidative polymerization has the advantage that the conductive polymer compound layer can be formed even in a pore of the anode body, and the electrolytic oxidative polymerization has the advantage that a thickness and a physical property of the conductive polymer compound layer can be easily controlled. In contrast to first conductive polymer compound layer 3, second conductive polymer compound layer 5 is preferably formed to cover whole surfaces of first conductive polymer compound layer 3 and silane coupling agent treatment layer 4. Therefore, the second conductive polymer compound layer is preferably formed in a polymerization condition of a higher monomer concentration and a higher temperature of a polymerization solution and a longer polymerization time as compared to that for formation of the first conductive polymer compound layer.

EXAMPLE 1

Referring to FIG. 1, for anode body 1 of a rectangular parallelepiped of 2.3 mm×1.8 mm×1.0 mm formed with sintered tantalum (Ta), which had anode lead member 11 inserted thereto from one end surface thereof (2.3 mm×1.0 mm), electrolytic oxidation was performed in a phosphoric acid solution of 65° C. by applying a constant voltage of 10 V for 10 hours to form dielectric oxide coating 2.

Then, an element formed as such was successively immersed at 25° C. in an ethanol solution including 3.0 M (a concentration in mol/liter, which is the same in the following) of pyrrole for 5 minutes and in a solution including 0.1 M of ammonium persulfate and 0.1 M of alkyl naphthalenesulfonic acid for 5 minutes to form first conductive polymer compound layer 3 on a portion of dielectric oxide coating 2. A spacing between portion layers 3a, 3b of first conductive polymer compound layer 3 measured with the SEM was at least 10 nm and smaller than 100 μm.

le;.5qThen, the element was immersed in a solution including 3.0 mass % of γ-glycidoxypropyltrimethoxysilane (a silane coupling agent "KBM-403" produced by Shin-Etsu Chemical Co., Ltd.) at 25° C. for 5 minutes and dried at 130° C. for 20 minutes to form silane coupling agent treatment layer 4 at least on a portion of dielectric oxide coating 2 on which first conductive polymer compound layer 3 was not formed. Next, the element was set as an anode in a solution including 0.2 M of pyrrole and 0.2 M of alkyl naphthalenesulfonic acid at 25° C., and a current of 0.5 mA was passed for 3 hours to form second conductive polymer compound layer 5.

Carbon layer 8 containing conductive carbon and cathode extraction layer 9 were then successively formed on second conductive polymer compound layer 5 to construct capacitor element 10. Furthermore, anode terminal 21 was welded to anode lead member 11, cathode terminal 22 was connected to cathode extraction layer 9 with a conductive adhesive, an outside of capacitor element 10 was covered and sealed with exterior resin 12 formed with an epoxy resin, and aging was performed to produce a solid electrolytic capacitor.

ESRs of the solid electrolytic capacitor measured in an initial state, after application of a constant voltage of 2.5 V at 105° C. for 500 hours, and after application of the constant voltage of 2.5 V at 105° C. for 1000 hours were 20.8 mΩ, 24.0 mΩ and 26.0 mΩ, respectively. The ESR was measured using an LCR meter (an inductance-capacitance-resistance measurement device). A result of ESRs of the solid electrolytic capacitor measured in the initial state and after voltage application tests at a high temperature is shown in Table 1.

In addition, a capacitance appearance rate of the solid electrolytic capacitor in the initial state calculated was 86.3%. The capacitance appearance rate used herein means a percentage (%) of an actual capacitance of the solid electrolytic capacitor to a capacitance of the element after formation of the dielectric oxide coating which was measured in a 30 mass % sulfuric acid solution. The actual capacitance was measured using the LCR meter.

Furthermore, an LC of the solid electrolytic capacitor measured in the initial state was 1.97 μA. The LC was measured and calculated by connecting a resistance of 1 kΩ in series to the capacitor to be measured, connecting a voltmeter in parallel to the resistance, and dividing a measured voltage by a resistance value to obtain the LC. Results of the ESR, capacitance appearance rate and LC of the solid electrolytic capacitor in the initial state are shown in Table 2.

COMPARATIVE EXAMPLE 1

A solid electrolytic capacitor was produced similarly as in example 1 except that, the element was not immersed in the solution including 3.0 mass % of γ-glycidoxypropyltrimethoxysilane and therefore the silane coupling agent treatment layer was not formed. ESRs of the solid electrolytic capacitor measured in an initial state, after application of 105° C.×constant voltage of 2.5 V×500 hours, and after application of 105° C.×2.5 V×1000 hours were 21.5 mΩ, 35.0 mΩ and 54.0 mΩ, respectively. A result of ESRs of the solid electrolytic capacitor measured in the initial state and after voltage application tests at a high temperature is shown in Table 1. In addition, a capacitance appearance rate of the solid electrolytic capacitor in the initial state was 82.1%, and an LC in the initial state was 9.45 μA. Results of the ESR, capacitance appearance rate and LC of the solid electrolytic capacitor in the initial state are shown in Table 2.

TABLE 1

|  |  | Example 1 | Comparative Example 1 |
|---|---|---|---|
| ESR (mΩ) | Initial State | 20.8 | 21.5 |
|  | 105° C. × 2.5 V × 500 hr | 24.0 | 35.0 |
|  | 105° C. × 2.5 V × 1000 hr | 26.0 | 54.0 |

As is obvious from Table 1, while the solid electrolytic capacitor according to the present invention having the silane coupling agent treatment layer formed after formation of the first conductive polymer compound layer had only a small increase in the ESR when a voltage was continuously applied at a high temperature, the ESR of the conventional solid electrolytic capacitor not having the silane coupling agent treatment layer formed thereon was substantially increased by continuous application of the voltage at the high temperature. This may have been caused by decreased adhesion between the dielectric oxide coating and the solid electrolyte layer of the conventional solid electrolytic capacitor due to the application of the voltage.

COMPARATIVE EXAMPLE 2

A solid electrolytic capacitor was produced similarly as in example 1 except that, referring to FIG. 2, the element having dielectric oxide coating 2 formed thereon was immersed in a solution including 3.0 mass % of γ-glycidoxypropyltrimethoxysilane at 25° C. for 5 minutes and dried at 130° C. for 20 minutes to form silane coupling agent treatment layer 4 on dielectric oxide coating 2, the element was then immersed at 25° C. in an ethanol solution including 3.0 M of pyrrole for 5 minutes and thereafter in a solution including 0.1 M of ammonium persulfate and 0.1 M of alkyl naphthalenesulfonic acid for 5 minutes to form first conductive polymer compound layer 3 on silane coupling agent treatment layer 4, and the element was set as an anode in a solution including 0.2 M of pyrrole and 0.2 M of alkyl naphthalenesulfonic acid at 25° C. and a current of 0.5 mA was passed for 3 hours to form second conductive polymer compound layer 5 on first conductive polymer compound layer 3. An ESR, a capacitance appearance rate and an LC of the solid electrolytic capacitor in the initial state were 21.0 mΩ, 79.3% and 6.88 μA, respectively. Results are shown in Table 2.

TABLE 2

|  | Example 1 | Comparative Example 1 | Comparative Example 2 |
|---|---|---|---|
| ESR (mΩ) | 20.8 | 21.5 | 21.0 |
| Capacitance Appearance Rate (%) | 86.3 | 82.1 | 79.3 |
| LC (μA) | 1.97 | 9.45 | 6.88 |

As is obvious from Table 2, as compared to the solid electrolytic capacitor of comparative example 1 not having the silane coupling agent treatment layer formed between the dielectric oxide coating and the solid electrolyte layer, the solid electrolytic capacitor of example 1 having the silane coupling agent treatment layer formed after formation of the first conductive polymer compound layer had an increased capacitance appearance rate and decreased ESR and LC. A likely reason for this is that, since the solid electrolytic capacitor of example 1 had the silane coupling agent treatment layer and the solid electrolyte layer formed on portions of the dielectric oxide coating, the contact area between the dielectric layer formed with the dielectric oxide coating and the silane coupling agent treatment layer and the solid electrolyte layer formed with the first and second conductive polymer compound layers was increased and adhesion between the dielectric oxide coating and the solid electrolyte layer was increased.

In addition, the solid electrolytic capacitor of example 1 also had an increased capacitance appearance rate and decreased ESR and LC as compared to the solid electrolytic capacitor of comparative example 2 having the first conductive polymer compound layer formed after formation of the silane coupling agent treatment layer. A likely reason for this is that, as is obvious by comparison between FIGS. 1 and 2, the contact area between dielectric layer 6 formed with dielectric oxide coating 2 and silane coupling agent treatment layer 4 and solid electrolyte layer 7 formed with first and second conductive polymer compound layers 3 and 5 was larger in the solid electrolytic capacitor of example 1 than in the solid electrolytic capacitor of comparative example 2.

Though the solid electrolytic capacitor of comparative example 2 had a decreased LC as compared to the solid electrolytic capacitor of comparative example 1, the capacitance appearance rate thereof also decreased. This may be caused by formation of the silane coupling agent treatment layer on a whole surface of the dielectric oxide coating, which resulted in an increased thickness of the dielectric layer formed with the dielectric oxide coating and the silane coupling agent treatment layer. In contrast, since the silane coupling agent treatment layer was formed only on a portion of the dielectric oxide coating in the solid electrolytic capacitor of example 1, a thickness of the dielectric layer formed with the dielectric oxide coating and the silane coupling agent treatment layer was not increased and therefore the dopant could be readily removed from the conductive polymer compound forming the solid electrolyte layer during aging, which may have resulted in a further decrease in the LC.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A solid electrolytic capacitor using a conductive polymer compound as a solid electrolyte, comprising:
    an anode body;
    a dielectric oxide coating formed on a surface of said anode body;
    a first conductive polymer compound layer formed on a portion of said dielectric oxide coating;
    a silane coupling agent treatment layer formed at least on a portion of the dielectric oxide coating on which the first conductive polymer compound layer is not formed; and
    a second conductive polymer compound layer formed on said first conductive polymer compound layer and said silane coupling agent treatment layer.

2. The solid electrolytic capacitor according to claim 1, wherein
    a spacing between one portion layer forming said first conductive polymer compound layer and another portion layer adjacent thereto is at least 10 nm and smaller than 100 µm.

3. The solid electrolytic capacitor according to claim 2, wherein
    each of said first conductive polymer compound layer and said second conductive polymer compound layer includes one of polypyrrole and polythiophene.

4. The solid electrolytic capacitor according to claim 1, wherein
    each of said first conductive polymer compound layer and said second conductive polymer compound layer includes one of polypyrrole and polythiophene.

* * * * *